United States Patent
Sun et al.

(10) Patent No.: US 9,210,630 B2
(45) Date of Patent: Dec. 8, 2015

(54) METHOD OF TRANSMITTING A SIGNAL RELATED TO MOBILITY MANAGEMENT IN A NETWORK SUPPORTING A NUMBER OF NETWORK MODES OF OPERATION

(71) Applicant: LG ELECTRONICS INC., Seoul (KR)

(72) Inventors: Li-Hsiang Sun, San Diego, CA (US); Jaehyun Kim, Anyang-si (KR); Laeyoung Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 296 days.

(21) Appl. No.: 13/750,748

(22) Filed: Jan. 25, 2013

(65) Prior Publication Data

US 2013/0188601 A1    Jul. 25, 2013

Related U.S. Application Data

(60) Provisional application No. 61/590,755, filed on Jan. 25, 2012.

(51) Int. Cl.

| | |
|---|---|
| *H04W 36/00* | (2009.01) |
| *H04W 36/14* | (2009.01) |
| *H04L 12/725* | (2013.01) |
| *H04W 48/18* | (2009.01) |
| *H04W 60/00* | (2009.01) |
| *H04W 72/04* | (2009.01) |
| *H04B 10/114* | (2013.01) |
| *H04W 28/18* | (2009.01) |
| *H04W 48/12* | (2009.01) |

(52) U.S. Cl.
CPC ........... *H04W 36/14* (2013.01); *H04L 45/3065* (2013.01); *H04W 48/18* (2013.01); *H04W 60/005* (2013.01); *H04B 10/1149* (2013.01); *H04W 28/18* (2013.01); *H04W 36/0022* (2013.01); *H04W 48/12* (2013.01); *H04W 72/04* (2013.01)

(58) Field of Classification Search
CPC . H04W 36/0022; H04W 48/12; H04W 28/18; H04W 72/04; H04L 45/3065; H04B 10/1149
USPC ........................................................ 370/331
See application file for complete search history.

(56) References Cited

U.S. PATENT DOCUMENTS

| | | | |
|---|---|---|---|
| 2006/0111134 A1* | 5/2006 | Mills ............................. | 455/518 |
| 2007/0184834 A1* | 8/2007 | Jeong et al. ................... | 455/434 |
| 2012/0014381 A1* | 1/2012 | Dwyer et al. ................. | 370/352 |

(Continued)

*Primary Examiner* — Andrew Chriss
*Assistant Examiner* — Salvador E Rivas
(74) *Attorney, Agent, or Firm* — Lee, Hong, Degerman, Kang & Waimey (57) ABSTRACT

The present description provides a method applicable to a network supporting a number of network modes of operation (NMOs). In the method, a user equipment (UE) in the NMO 1 receives a control signal, such as mobility management backoff timer, indicating an access restriction on packet switched (PS) domain of the network. Therefore, the UE in the NMO 1 performs location area update (LAU) procedure associated with circuit switched (CS) domain without performing combined routing area update (RAU) procedure associated with both the PS domain and the CS domain, while the access restriction is in place. The UE in the NMO 1 is configured to perform combined attach procedure, which is associated with both the PS domain and the CS domain, when attaching to the network. Further, the UE in the NMO 2 is configured to perform CS attach procedure and PS attach procedure separately, when attaching to the network.

9 Claims, 7 Drawing Sheets

(56) References Cited

U.S. PATENT DOCUMENTS

| | | | |
|---|---|---|---|
| 2012/0020287 A1* | 1/2012 | Chin et al. | 370/328 |
| 2012/0218889 A1* | 8/2012 | Watfa et al. | 370/230 |
| 2012/0294143 A1* | 11/2012 | Niemi et al. | 370/230 |
| 2013/0150031 A1* | 6/2013 | Hedman et al. | 455/433 |

* cited by examiner

METHOD OF TRANSMITTING A SIGNAL RELATED TO MOBILITY MANAGEMENT IN A NETWORK SUPPORTING A NUMBER OF NETWORK MODES OF OPERATION

CROSS-REFERENCE TO RELATED APPLICATIONS

Pursuant to 35 U.S.C. §119(e), this application claims the benefit of U.S. Provisional Patent Application Ser. No. 61/590,755, filed on Jan. 25, 2012, the contents of which are hereby incorporated by reference herein in their entirety.

BACKGROUND OF THE INVENTION

1. Field of the Invention

The technical features of this document relate to wireless communications, and more particularly, to a method and apparatus for processing data related to mobility management in a network supporting various types of communication schemes.

2. Related Art

The Third Generation Partnership Project (3GPP) Long Term Evolution (LTE) which is a set of enhancements to the Universal Mobile Telecommunications System (UMTS) is introduced as 3GPP Release 8. The 3GPP LTE uses orthogonal frequency division multiple access (OFDMA) for a downlink, and uses single carrier frequency division multiple access (SC-FDMA) for an uplink, and adopts multiple input multiple output (MIMO) with up to four antennas. In recent years, there is an ongoing discussion on 3GPP LTE-Advanced (LTE-A), which is a major enhancement to the 3GPP LTE.

3GPP LTE technology supports packet based services associated with packet switched domain (PS-domain) only, however 3GPP does specify fallback for circuit switched services associated with circuit switched domain (CS-domain) as well. In LTE architecture, the CS-fallback in an Evolved Packet System (EPS) enables the provisioning of voice and traditional CS-domain services. To provide these services, LTE may reuse CS infrastructure when the UE is served by LTE.

SUMMARY OF THE INVENTION

The technical features of this document provide a method and wireless apparatus for performing data related to mobility management in a network supporting various types of communication schemes.

In one aspect, the proposed method is applicable to a network supporting a number of network modes of operation (NMOs) including NMO 1 and NMO 2. The proposed method includes receiving, by a user equipment (UE) in the NMO 1, a control signal indicating an access restriction on packet switched (PS) domain of the network.

Alternatively or additionally, the UE in the NMO 1 performs location area update (LAU) procedure associated with circuit switched (CS) domain without performing combined routing area update (RAU) procedure associated with both the PS domain and the CS domain, while the access restriction is in place.

Alternatively or additionally, the UE in the NMO 1 is configured to perform combined attach procedure, which is associated with both the PS domain and the CS domain, when attaching to the network.

Alternatively or additionally, the UE in the NMO 2 is configured to perform CS attach procedure and PS attach procedure separately, when attaching to the network.

In another aspect, the proposed method is applicable to a number of networks, such as LTE and convention CDMA system. The proposed method includes: performing communication based on voice over Internet Protocol (VoIP) session with a first type network, wherein a non-Guaranteed Bit Rate (non-GBR) bearer is established during the VoIP session; performing handover from the first type network to a second type network to perform Single Radio Voice Call Continuity (SRVCC), wherein the non-GBR bearer is suspended while the SRVCC is performed; and when performing inter-system change from the second type network to the first type network, performing tracking area update (TAU) to the first type network. With respect to the non-GBR bearer, it should be noted that there is a certain type of non-GBR bearer, such as a bearer for default PDN connection, is not established during the VoIP session.

DESCRIPTION OF EXEMPLARY EMBODIMENTS

The technology described below can be used in various wireless communication systems such as code division multiple access (CDMA), a frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The OFDMA can be implemented with a radio technology such as institute of electrical and electronics engineers (IEEE) 802.11 (Wi-Fi), IEEE802.16 (WiMAX), IEEE802-20, evolved UTRA (E-UTRA), etc. The UTRA is a part of a universal mobile telecommunication system (UMTS). The $3^{rd}$ generation partnership project (3GPP) long term evolution (LTE) is a part of an evolved UMTS (E-UMTS) using the E-UTRA. The 3GPP LTE uses the OFDMA in the downlink and uses the SC-FDMA in the uplink.

Figure 1:
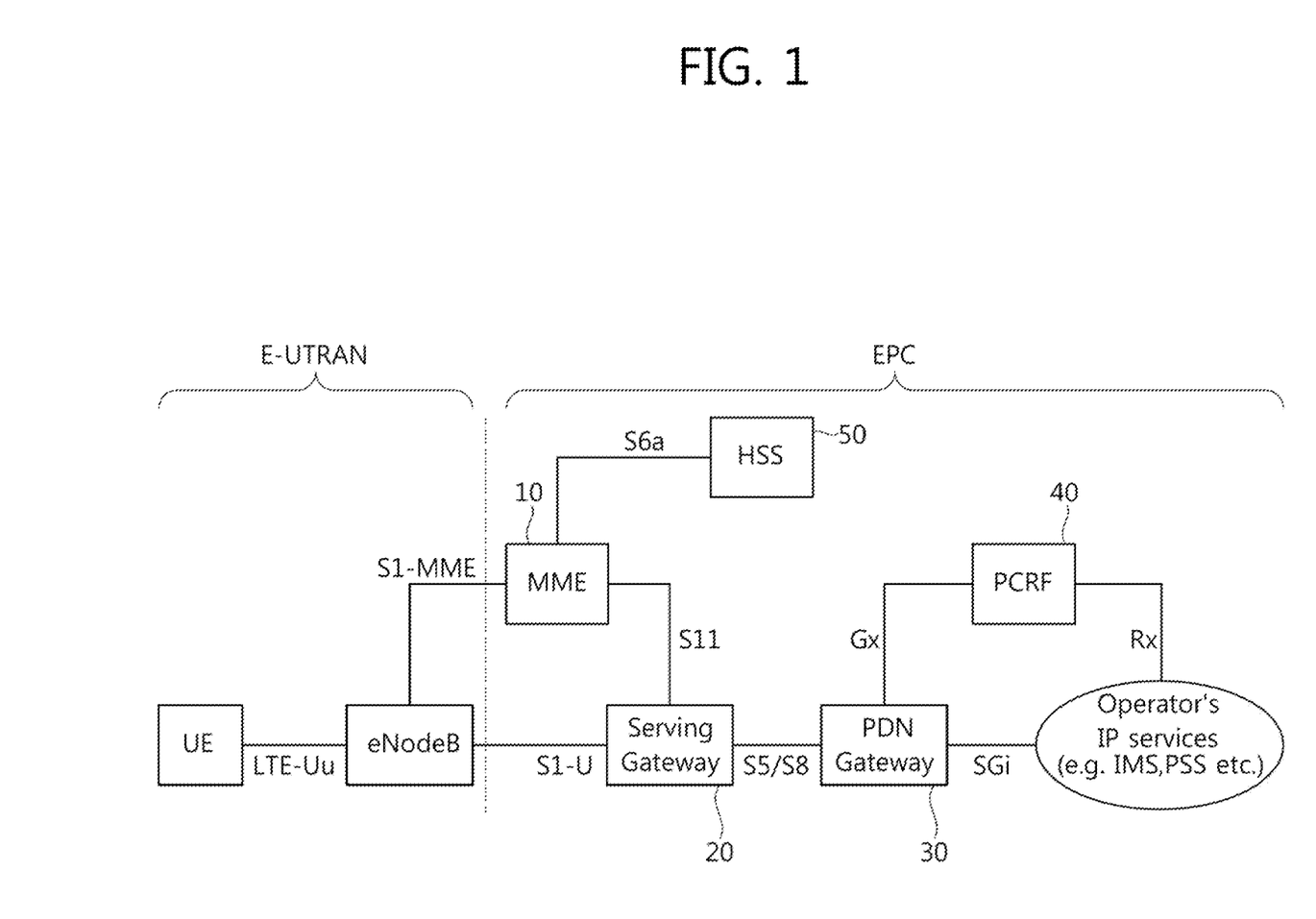
FIG. 1 is a view illustrating an Evolved Packet System which is associated with the Long Term Evolution (LTE) system.

FIG. 1 is a view illustrating an Evolved Packet System which is associated with the Long Term Evolution (LTE) system. The LTE system aims to provide seamless Internet Protocol (IP) connectivity between a user equipment (UE) and a pack data network (PDN), without any disruption to the end user's application during mobility. While the LTE system encompasses the evolution of the radio access through an Evolved Universal Terrestrial Radio Access Network (E-UT- RAN) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of 'EPS bearers' to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 10, a PDN gateway (PDN-GW or P-GW) 30, a Serving Gateway (S-GW) 20, a Policy and Charging Rules Function (PCRF) 40, a Home subscriber Server (HSS) 50, etc.

The MME 10 is the control node which processes the signaling between the UE and the CN. The protocols running between the UE and the CN are known as the Non-Access Stratum (NAS) protocols. Examples of functions supported by the MME 10 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 20 serves as the local mobility anchor for the data bearers when the UE moves between eNodeBs. All user IP packets are transferred through the S-GW 20. The S-GW 20 also retains information about the bearers when the UE is in an idle state (known as ECM-IDLE) and temporarily buffers downlink data while the MME initiates paging of the UE to re-establish the bearers. Further, it also serves as the mobility anchor for inter-working with other 3GPP technologies including 2G and 3G network, i.e., GPRS (General Packet Radio Service) and UMTS (Universal Mobile Telecommunications System).

The P-GW 30 serves to perform IP address allocation for the UE, as well as QoS enforcement and flow-based charging according to rules from the PCRF 40. The P-GW 30 performs QoS enforcement for Guaranteed Bit Rate (GBR) bearers. It also serves as the mobility anchor for inter-working with non-3GPP technologies such as CDMA2000 and WiMAX networks.

The PCRF 40 serves to perform policy control decision-making, as well as for controlling the flow-based charging functionalities.

The HSS 50, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, Sha, Gx, Rx and SGi are defined.

Figure 2:
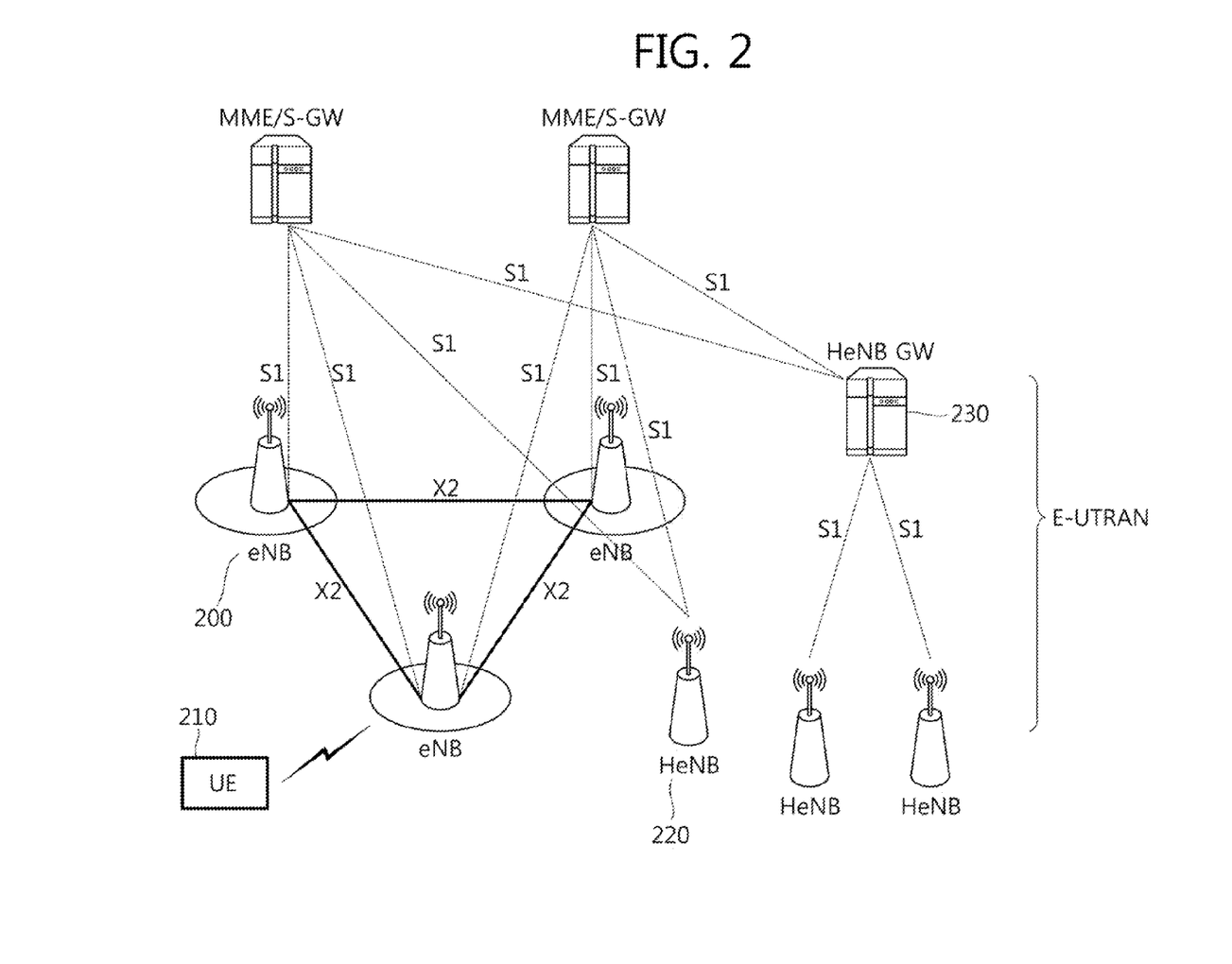
FIG. 2 is a view illustrating an overall architecture of the E-UTRAN to which the following technical features are applied.

FIG. 2 is a view illustrating an overall architecture of the E-UTRAN to which the following technical features are applied.

The E-UTRAN includes at least one eNB (evolved-Node B) 200 providing a user plane and a control plane towards a user equipment (UE) 210. The UE can be fixed or mobile and can be referred to as another terminology, such as a MS (Mobile Station), a UT (User Terminal), an SS (Subscriber Station), an MT (mobile terminal), a wireless device, or the like. The eNB 200 may be a fixed station that communicates with the UE 100 and can be referred to as another terminology, such as a base station (BS), a NB (NodeB), a BTS (Base Transceiver System), an access point, or the like.

The protocols running between the eNBs 200 and the UE 210 are known as the Access Stratum (AS) protocols.

The BSs (or eNBs) 200 are interconnected with each other by means of an X2 interface. The BSs 200 are also connected by means of the S1 interface to the aforementioned Evolved Packet Core EPC elements, more specifically to the Mobility Management Entity (MME) by means of the S1-MME and to the Serving Gateway (S-GW) by means of the S1-U.

The E-UTRAN architecture depicted in FIG. 2 may further comprise a Home evolved Node B (HeNB) 220 and an HeNB GW (HeNB gateway) 230.

The HeNB 220 is fundamentally similar to a typical eNB, but it can be simple devices typically installed by end users themselves. The HeNB 220 is also referred to as an HNB (home NB), a femto cell, a home cellular base station, etc. The HeNB 220 behaves like a cellular network with respect to communication devices, which can use their regular cellular network radio interface to communicate with them, and connects to a cellular network operator's core network through the alternate network access, such as Internet access via fiber, DSL or cable subscriptions. In general, the HeNB 220 has a low radio transmission output power compared to the BS owned by mobile communication service providers. Therefore, the service coverage provided by the HeNB 220 is typically smaller than the service coverage provided by the eNB 200. Due to such characteristics, the cell provided by the HeNB 220 is classified as a femto cell in contrast to a macro cell provided by the eNB 200 from a standpoint of the service coverage.

Hereinafter, the concept of an EPS bearer is explained. The EPS (Evolved Packet System) uses the concept of EPS bearers to route IP traffic from a gateway in the PDN (pack data network) to the UE. The EPS bearer is an IP packet flow with a Quality of Service (QoS) between the gateway and the UE. The E-UTRAN and EPC (Evolved Packet Core) together set up and release EPS bearers as required by applications.

The EPS bearer is typically associated with the QoS. Multiple bearers can be established for a user in order to provide different QoS streams or connectivity to different PDNs. For example, a user might be engaged in a voice (e.g., VoIP) call while at the same time performing web browsing or File Transfer Protocol (FTP) download. A VoIP bearer would provide the necessary QoS for the voice call, while a best-effort bearer would be suitable for the web browsing or FTP session.

Broadly, EPS bearers can be classified into two categories based on the nature of the QoS they provide. The two categories are Minimum Guaranteed Bit Rate (GBR) bearers and Non-GBR bearers. The GBR bearers have an associated GBR value for which dedicated transmission resources are permanently allocated at bearer establishment/modification. Bit rates higher than the GBR may be allowed for a GBR bearer if resources are available. On the other hand, the non-GBR bearers do not guarantee any particular bit rate. For these bearers, no bandwidth resources are allocated permanently to the bearer.

Further, EPS bearers can be classified in a different manner. In particular, the EPS bearers can be classified into a default bearer and a dedicated bearer. The default bearer is an EPS bearer which is first established for a new PDN connection and remains established throughout the lifetime of the PDN connection. The default bearer gets established with every new PDN connection. Namely, when the UE connects to the P-GW by means of a procedure called 'Initial Attach', a new or default bearer is created and its context remains established throughout the lifetime of that PDN connection. The UE can be attached to more than one P-GW, and thus the UE can have more than one default bearer. The default EPS bearer is a non-GBR bearer and associated with a best effort QoS, wherein the best effort QoS is the lowest of all QoS traffic classes. Bearers which are not created at the initial attach procedure can be referred to as dedicated bearers. The dedicated bearer is an EPS bearer that is associated with uplink packet filters in the UE and downlink packet filters in the PDN GW where the filters only match certain packets.

Hereinafter, the relationship of the EPS bearer and lower layer bearers such as S1, S5/S8, radio bearers and E-RAB is explained.

Figure 3:
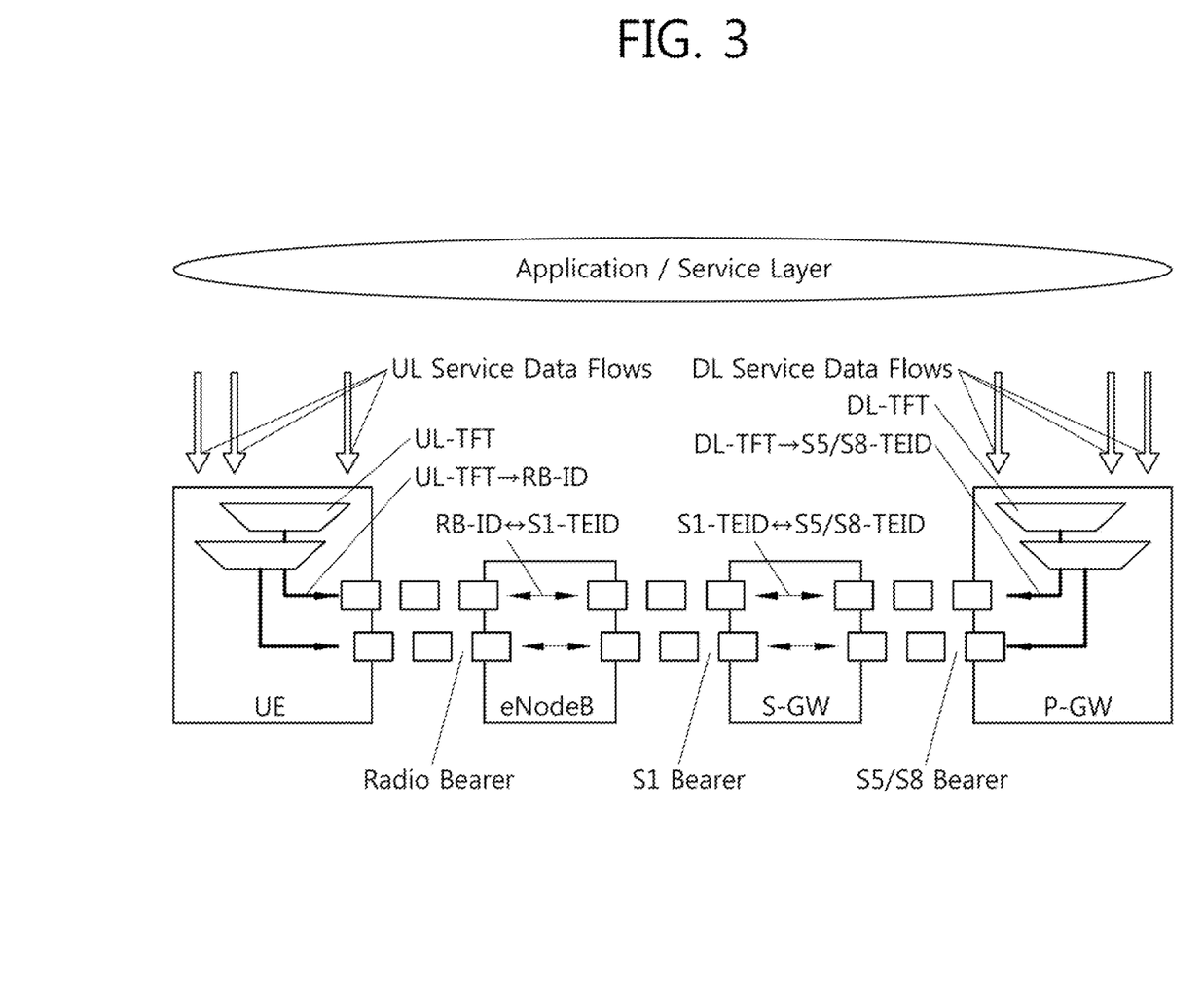
FIG. 3 is a view illustrating EPS bearers crossing multiple interfaces.

The EPS bearer has to cross multiple interfaces as shown in FIG. 3—the S5/S8 interface from the P-GW to the S-GW, the S1 interface from the S-GW to the eNodeB, and the radio interface (also known as the LTE-Uu interface) from the eNodeB to the UE. Across each interface, the EPS bearer is mapped onto a lower layer bearer, each with its own bearer identity. Each node keeps track of the binding between the bearer IDs across its different interfaces.

An S5/S8 bearer transports the packets of the EPS bearer between the P-GW and the S-GW. The S-GW stores a one-to-one mapping between an S1 bearer and an S5/S8 bearer. Each bearer is identified by the GTP (GPRS Tunneling Protocol) based Tunnel Endpoint ID (also known as a TEID) across both interfaces.

An S1 bearer transports the packets of an EPS bearer between the S-GW and the eNodeB. A radio bearer (also known as a radio data bearer) transports the packets of an EPS bearer between the UE and the eNodeB. Each bearer is identified by the GTP (GPRS Tunneling Protocol) tunnel endpoint ID (also known as a TEID or a GTP TEID) across both interfaces.

Further, the concept of the E-RAB (E-UTRAN Radio Access Bearer) may be used. An E-RAB transports the packets of an EPS bearer between the UE and the EPC (GPRS Tunneling Protocol), more specifically to the S-GW through eNB. When an E-RAB exists, there is a one-to-one mapping between this E-RAB and an EPS bearer.

IP packets mapped to the same EPS bearer receive the same bearer-level packet forwarding treatment (e.g., scheduling policy, queue management policy, rate shaping policy, or RLC configuration). Providing different bearer-level QoS thus requires that a separate EPS bearer is established for each QoS flow, and user IP packets must be filtered into the different EPS bearers.

Hereinafter, the concept of Non-Access Stratum (NAS) states and Access Stratum (AS) states. A UE's behavior can be defined using a number of states, i.e., NAS and AS states, which describe whether the UE is registered with the Evolved Packet Core (EPC) and whether it is active or idle.

The first NAS states, i.e., EMM-REGISTERED and EMM-DEREGISTERED, are associated with EPC mobility management (EMM) which is managed by the EMM protocol in the UE and the MME. The UE's EMM states depend on whether the UE is registered with the EPC. In the state EMM-REGISTERED, the UE is registered with a serving MME and a serving gateway (S-GW) and has an IP address and a default EPS bearer. In the state EMM-DEREGISTERED, the UE is switched off or our of coverage.

The second NAS states, i.e., ECM-IDLE and ECM-CONNECTED, are associated with EPS connection management (ECM). These states are managed by the EMM protocol. The state ECM-IDLE is also referred to as EMM-IDLE, and the state ECM-CONNECTED is also referred to as EMM-CONNECTED in a certain standard document (e.g., 3GPP TS 24.301) while terminologies 'ECM'-CONNECTED' and 'ECM-IDLE' are preferred in other standard documents (e.g., 3GPP TS 23.401). The UE's ECM states depend of whether the UE is active or on standby, from a NAS protocol perspective. An active UE is in ECM-CONNECTED state. In this state, all the data bearers and signaling radio bearers are in place. When on standby, a mobile is in ECM-IDLE. In this state, it would be inappropriate to hold all the bearers in place. Therefore, the network tears down a UE's S1 bearer and radio bearers whenever the UE enters ECM-IDLE. However, the EPS bearers remain in place, and the S5/S8 bearers also remain in place. When in idle, the MME does not know exactly where an idle UE is located. Instead, the MME just knows which tracking area (TA) the UE is in. The detailed features of the TA will be described below.

The AS states are associated with a radio resource control (RRC). These states are managed by the RRC protocol in the UE and a serving eNB. The UE's RRC state depends on whether it is active or idle, from an AS protocol perspective. An active UE is in RRC_CONNECTED state. In this state, the UE is assigned to a serving eNB, and can freely communicate using signaling message on Signaling Radio Bearers 1 (SRB1). When on standby, a UE is in RRC_IDLE. Mobility control in RRC_IDLE is UE-controlled (cell-reselection), while in RRC_CONNECTED it is controlled by the E-UTRAN (handover).

Hereinafter, the concept of mobility management (MM) and a tracking area (TA) (MM) is explained in detail. All UE-related information in the access network can be released during periods of data inactivity, i.e., the ECM-IDLE. The MME retains the UE context and information about the established bearers during the idle periods.

To allow the network to contact UEs in the ECM-IDLE, the UEs update the network as to its new location whenever it moves out of its current Tracking Area (TA). This procedure is called a 'Tracking Area Update (TAU)', and a similar procedure is also defined in a universal terrestrial radio access network (UTRAN) or GSM EDGE Radio Access Network (GERAN) system and is called a 'Routing Area Update (RAU)'. The MME (for LTE) and/or SGSN (for UTRAN/GERAN) serves to keep track of the user location while the UE is in the ECM-IDLE state.

When there is a need to deliver downlink data to the UE in the ECM-IDLE state, the MME transmits a paging message to all base stations (i.e., eNodeBs) in UE registered tracking area(s) (TA). Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. Upon receipt of a time value associated with the MM back-off timer, the UE may activate the MM back-off timer according to the time value given by the network. However, even when the MM back-off timer is running, the UE can receive a paging message and be thereby paged, if the network has downlink data for the UE. As explained above, when the UE responding the page message, the Service Request Procedure is required under the current 3GPP specification.

The MM backoff timer can be signaled for two core network domains, i.e., a PS (packet switched) and CS (circuit switched) MM backoff timers. Further, UEs are prevented from performing location area update (LAU) while the CS MM backoff timer is running, and UEs are prevented from performing routing area update (RAU)/tracking area update (TAU) while the PS MM backoff timer is running.

Even when the MM backoff timer is running, there are situations where UEs are allowed to transmit MM signals. For instance, if the UE is in emergency situation or involved in high priority services, the UE can transmit MM signals when the MM backoff timer is running. Further, when mobile terminated (MT) signals are received at the UE, the MM backoff timer can be disregarded.

The RAU/TAU procedure is associated with the PS domain for location update purposes, while a 'location area update (LAU)' procedure is the one for the CS domain. In general, the coverage of the location area (LA) for the CS domain is greater than that of the routing area (RA) or Tracking Area (TA). For the TAU, a TAU request message transmitted from UEs are delivered to the MME, whereas a RAU request message is delivered to a SGSN (serving general packet radio service support node).

3GPP LTE is designed to provide all services using IP without existing CS domain function. Accordingly, services like voice calls and Short Message Service (SMS) which have traditionally been provided over the CS domain will be replaced. This will eventually require the deployment of the IP Multimedia Subsystem (IMS) as a service control platform. The IMS can be a communication system which integrates services provided by CS using internet technology such as session initiation protocol (SIP).

However, at the beginning of LTE deployment, it requires significant time before IMS and VoIP (Voice over IP) services can be provided due to the size of the coverage area, the time required for facility planning, etc. As a consequence, a scenario in which services are provided in a step-by-step approach has been discussed at 3GPP. Accordingly, a number of functions switching from/to CS domain has been proposed.

Figure 4:
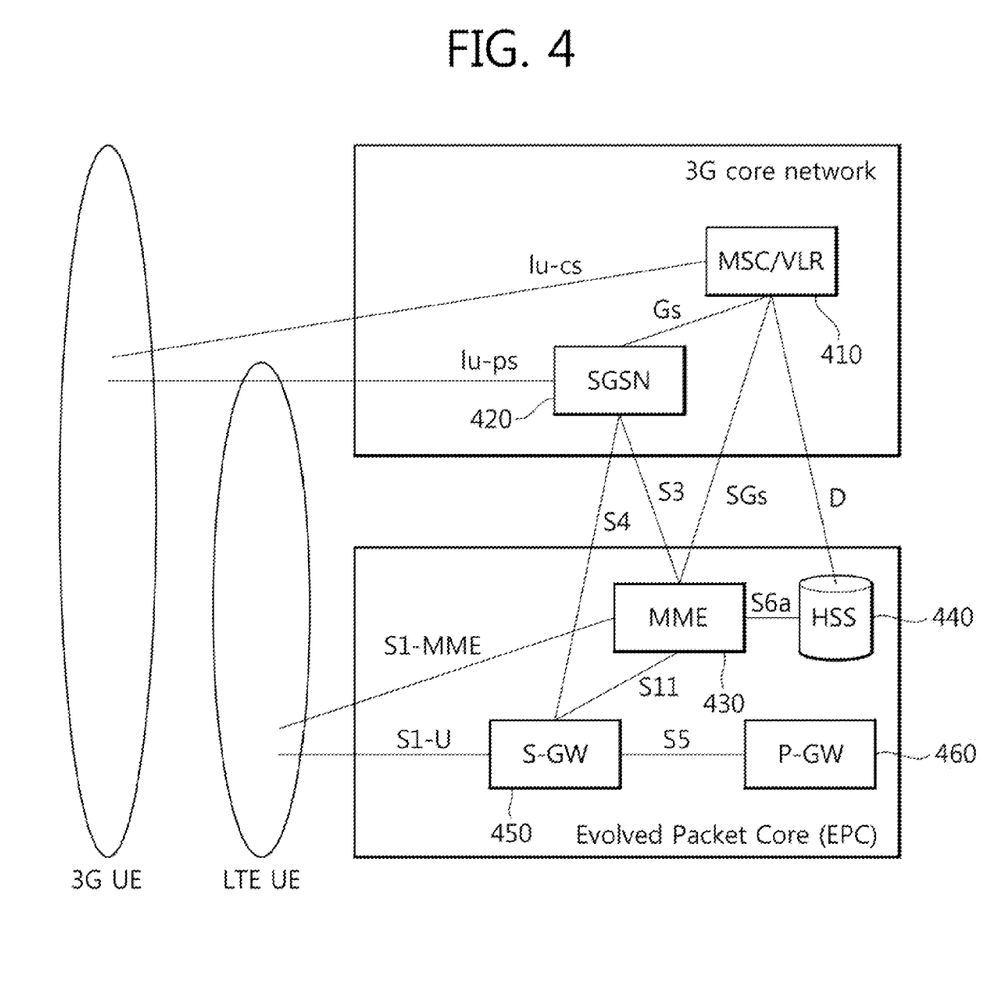
FIG. 4 is a block diagram showing architecture in which CS domain and PS main coexist.

FIG. 4 is a block diagram showing architecture in which CS domain and PS main coexist. Referring to FIG. 4, the architecture includes a mobile switching center (MSC)/visitor location register (VLR) 410, SGSN 420, MME 430, HSS 440, S-GW 450, P-GW 460. Between the network elements/entities shown in FIG. 4, various interfaces such as A/Iu-cs, SGs, and Gb/Iu-ps are defined.

While the VLR can be implemented as a separate entity, it can be included in a mobile switching center (MSC) and referred to as 'MSC/VLR'. The MSC is a logical node/entity having CS (circuit switched) functions specified by 3GPP. The VLR is a logical node located between UEs and HSS 440. The VLR serves as a database storing and managing subscriber information and provides function such as mobility management (MM) for UEs. In detail, VLR contains CS subscriber data required for CS call handling and mobility management context for mobile subscribers currently located in the area controlled by the VLR. Thus, the VLR can maintain the UE's CS context.

The interface connecting MSC/VLR 410 and MME 430 is called an SGs reference point. This interface is based on the concept of the Gs reference point that exchanges signaling with MSC, which connects to the SGSN 420, a 3G packet switch. The SGs provides nearly all the functions provided by the existing Gs. The MME 430, HSS 440, S-GW 450, P-GW 460 can perform various functions described in an example of FIG. 1.

Combined mobility management (MM) between the CS domain and the EPC (i.e., the PS domain) can be provided in example FIG. 4. As discussed above, MM is a procedure for determining terminal location. As basic function of mobile communication, 3G (i.e., CS domain) and LTE (i.e., PS domain) each provide a MM function. However, to support function related to both the CS and PS domains, the CS domain needs to know which PS location registration area (e.g., routing area or tracking area) UEs are currently camp on. To this end, PS domain entities, such as the MME 430, can correlate MM control of the CS domain with that of EPC and inform the MSC/VLR 410 that the UEs are present in an LTE location registration area (i.e., TA).

Further, it should be noted the network, such as UMTS, provides a number of network modes of operation including NMO 1 (or NMO-I) and NMO 2 (or NMO-II) to support combined attach procedure. In detail, the core network can support a number of Network Modes of Operation (NMOs), which are sometimes referred to as Network Operation Modes (NOMs). In Network Operation Mode I (NMO-I or NMO 1), combined attach procedure including GPRS attach procedure (associated with the PS domain and RAU) and IMSI attach procedure (associated with the CS domain and LAU) can be performed. By performing the combined attach procedure, RAU and LAU are performed at the same time, thereby saving radio resources. Specifically, NMO-I can be used when the Gs interface between the MSC/VLR 410 and SGSN 420 is presented. In Network Operation Mode II (NMO-II or NMO 2), the Gs interface is not present, so the two different attach procedures should be performed separately and independently. While two network operation modes (i.e., NMO-I & II) are defined in UTRAN, GERAN further defines NMO III. It should be noted that the combined attach is not supported in the NMO III, since the GS interface is not present. Once a certain cell operates in a certain NMO, UEs in such cell will also operate in the same NMO.

Here, the concept of machine-to-machine (M2M) or machine type (MTC) communication device is described. M2M communication or MTC is the communication between machines that do not necessarily need human intervention. The 3GPP has started an effort to determine potential network optimizations that could lower the operational costs associated with offering these new M2M services. While normal access is associated with communication necessarily need human intervention, delay tolerant access (DTA) is associated with the MTC between machines that do not necessarily need human intervention. The MTC is expected to have applications in areas, such as smart metering, home automation, e-Health, fleet management, etc. In 3GPP LTE, the support of MTC (or M2M) nodes (or interchangeably delay-tolerant access or low priority access) requires very efficient operating mechanisms and protocols for the traffic channel and random access channel. MTC has a number of unique characteristics which may be used to optimize the usage of the operator network. These characteristics include, for example: mostly data-centric communication (voice not expected), a potentially large number of communicating terminals, a low traffic volume per terminal, a potentially low mobility for some devices, and potentially power-limited devices.

The present description provides a scheme in which UEs in NMO 1 perform mobility management while the access restriction on the PS domain is in place. In detail, UEs may perform a location area update (LAU) procedure instead of the combined RAU procedure while a PS MM backoff timer (i.e., T3346) is running even when the UEs are operating in NMO 1. If UEs in NMO 1 performs the combined RAU procedure while the T3346 is running, the following technical problems may occur.

Under the current standard, once access restriction on the PS domain is in place, the UE in NMO 1 cannot perform the combined RAU procedure due to the access restriction on the PS domain. Such inability (i.e., the access restriction) may be unknown to SGSN, since such access restriction may not be determined or given by the SGSN. For instance, if congestion occurs in the PS domain, the UE may receive the PS mobility management backoff (i.e., T3346) due to RRC connection release/reject. In other words, the T3346 can be given to the UE through an RRC connection release message or reject message when congestion control is applied to the PS domain of the UMTS. Further, the access restriction may be in place, if a certain type of access barring is broadcasted by radio access network (RAN) for the PS domain.

Once the T3346 is given, the UE starts its timer (i.e., MM BO timer) until the given timer value expires. While the MM BO timer is running, the UE in NMO 1 cannot perform combined RAU, since the UE determines that access to the SGSN, which controls the PS domain and by-passes CS domain related signals to MSC/VLR, is restricted.

This inability of UEs not performing the combined RAU procedure can cause the following problems. If the UE operates in NMO-1 with the period-RAU (P-RAU) timer expiring, the UE cannot perform the RAU to the SGSN since the UE determines that access to the SGSN is restricted. The P-RAU timer is used to periodically notify the availability of the UE and is maintained by the UE and the SGSN. However, if the P-RAU is not performed in a timely manner, UE context may be released. Specifically, the SGSN cannot receive MM signals and, therefore, the implicit SGSN eventually detaches the UE. Thereafter, the SGSN will notify the MSC/VLR via the Gs interface for implicit IMSI detach.

If the UE is implicitly detached from the SGSN, the UE cannot receives a CS paging even when the UE actually exists within the coverage of the CS domain. In other words, if the UE is implicitly detached, even there is no restriction on the CS domain, the UE cannot receives the CS paging.

To solve the above problem, the present description proposes a scheme in which the UE performs a separate LAU directly with the MSC/VLR, instead of performing the combined RAU to the SGSN. In detail, the LAU can be performed when the P-RAU timer expires after the access restriction on the PS domain is in place and when the UE and its cell operate in NMO 1. Alternatively, the LAU can be immediately performed when the access restriction is in place and the UE (and its cell) operates in NMO-I.

The above feature (i.e., performing LAU instead of combined RAU) can be narrowed to the UE in idle mode. This may be beneficial since the SGSN would maintain the UE context during the connected mode. The UE may operate as if it were in NMO 2 or MNO 3 after performing the LAU and manage PS and CS registration separately.

The above problem and solution are related to a situation where the P-RAU timers is expired. However, the above features are applicable to a situation where the UE moves to another routing area (RA).

As discussed above, the UE in NMO 1 may not perform combined RAU due to restrictions on the PS domain (e.g. receives PS mobility management backoff T3346, or a certain type of access barring broadcast by the RAN for the PS domain). The UE in NMO-I may move to another Routing Area (RA). In this case the UE cannot perform combined RAU. Further, as discussed above, even if the SGSN receives the CS paging from MSC/VLR via the Gs interface and the SGSN pages the UE in its registered RA, the UE cannot receive CS paging even though the access restriction was placed on the PS domain.

To solve the above situation, the UE should perform LAU upon RA change. Further, it is suggested that the above feature (i.e., performing LAU instead of combined RAU) is only performed when the RA change occurs during the idle mode, since the access restriction for performing RAU may not take place in the connected mode. As discussed above, the UE may operate as if it were in NMO 2 or MNO 3 after performing LAU and manage PS and CS registration separately.

The above examples are restricted to situations where the P-RAU expires and RA changes, but technical features of the present description are not limited thereto.

Figure 5:
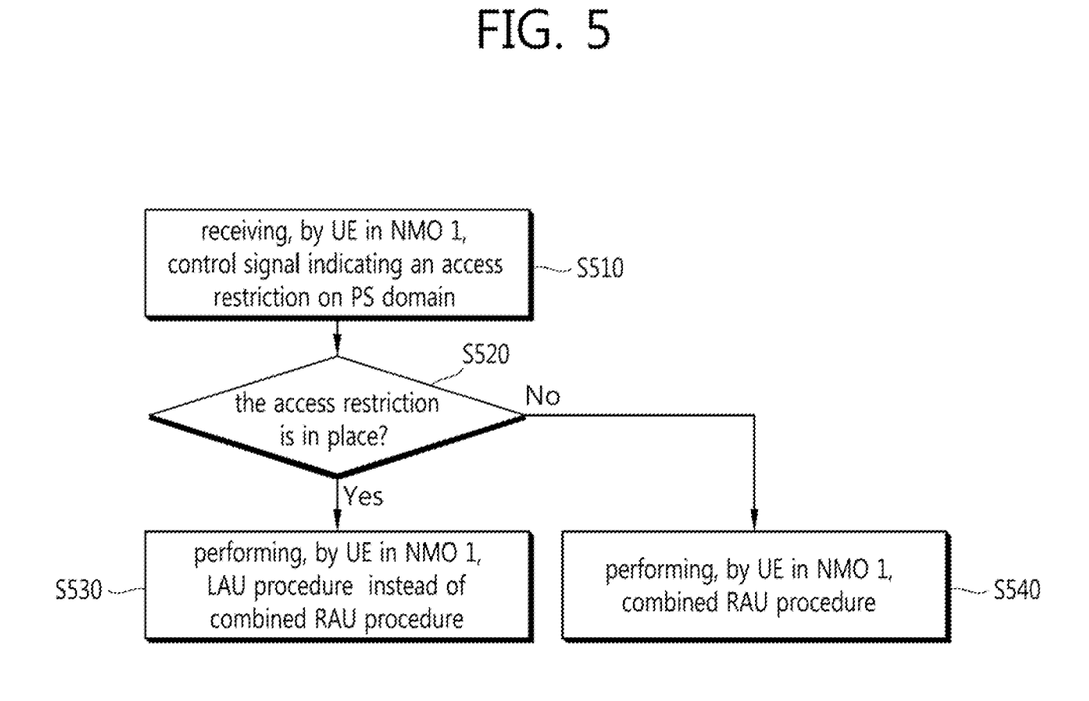
FIG. 5 is a flow chart describing one example of the present description.

FIG. 5 is a flow chart describing one example of the present description.

FIG. 5 is applicable to UEs operating in NMO 1 in which the Gs interface is present between the MSC/VLR and SGSN, thereby allowing combined attach to both CS and PS domains. As shown in Step S510, the UE in NMO 1 receives a control signal indicating an access restriction on the PS domain of the network. Examples of the control signal includes a signal transmitting a PS MM backoff time value used for a PS MM backoff timers equipped in UEs. The PS MM backoff time value can be provided by various entities related to the PS domain, such as the MME and the SGSN.

After the control signal indicating the access restriction on the PS domain is received, the UE in NMO1 can be required to update its location in the SGSN. For instance, the P-RAU timer may expire or the UE may enter another routing area (RA).

In such situation, the UE determines whether the access restriction on the PS domain is in place, as shown in Step S520. For instance, if the PS MM backoff timer is still running in the UE operating in NMO 1, the UE determines that the access restriction on the PS domain is still in place, and thereafter performs the LAU to the MSC/VLR instead of the combined RAU to the SGSN, as shown in Step S530. Namely, the LAU can be performed when the P-RAU timer expires after the access restriction on the PS domain is in place and when the UE and its cell operate in NMO 1. Since the UE attempts to update its location in MSC/VLR directly, the combined RAU is not required to be performed. Alternatively, the LAU can be immediately performed when the access restriction is in place and MS (and its cell) operates in NMO-I, as explained above.

If the access restriction is not in place any more, the UE in NMO 1 reverts back to usual operation and performs the combined RAU procedure to the SGSN, as shown in Step S540. For instance, if the MM BO timers expires, the PS access restriction is lifted, and the MS is in a NMO 1 cell, the UE can revert back to usual operation.

As discussed above, the UE can be a MTC/M2M device. Further, it is preferable that the UE operates in the idle mode, as opposed to the connected mode, during which the SGSN would maintain the UE context.

The present description proposes another scheme associated with detach procedure.

UEs attached to the network may request detach from the network. The detach procedure can be initiated from UEs or the network. If the UE-initiated detach is properly handled by the network, the UE will receive a detach accept message from the network. In the meantime, in case where both the UE and the network initiate detach procedure, the current standard, which is described in 3GPP TS 24.008, enables the detach initiated from the UE to be never rejected by the network. This is the general solution to solve the detach procedure collision in 3GPP system.

However, based on the abnormal case handling, the current standard proposes a different scheme which contradicts the general solution. In detail, based on the current standard associated with the abnormal case, if the UE requests detach type 'EPS detach', which is associated with the PS domain, or 'combined EPS/IMSI detach', which is associated with the PS and CS domains, and if the UE receives network-initiated detach type 'IMSI' detach, the UE is required to stay EPS attached. Further, the UE is required to perform a combined Tracking Area Update (TAU) to the network. This operation of the UE directly contradicts the general solution and causes a technical problem, in which the UE which had requested detach to switch to another RAT or for power saving cannot be properly detached.

To solve the above technical problem, the present description proposes UEs to ignore the network-initiated detach procedure, if the UE-initiated detach procedure collides with the network-initiated procedure, as described above.

Further, the present description proposes another scheme associated with bearer suspension in 1× Single Radio Voice Call Continuity (SRVCC).

If the IP multimedia subsystem (IMS) which supports voice call is deployed in a certain LTE system and if the UE supporting voice over Internet Protocol (VoIP) session are present in the LTE coverage, the UE can use voice call services with the LTE system. While using ongoing VoIP session over the IMS, the UE may move out of the coverage of the LTE system and enters into conventional 3G networks, such as, 3GPP2 system, CDMA 2000 1xRTT, etc. Namely, the UE may perform 1× Single Radio Voice Call Continuity (1×SRVCC) which provides continuous voice call flow to UEs moving from E-UTRAN to 3GPP2.

Under the current standard, while the UE performs 1×SRVCC, the non-Guaranteed Bit Rate (GBR) bearers are suspended. Further, if the UE moves back to the LTE coverage from the 3G network, the UE is not required to perform the TAU to the LTE system.

However, if the TAU is not properly performed to the LTE system after coming back to the LTE coverage, the non-GBR bears are maintained to be suspended. Therefore, the present description propose to perform a TAU to the LTE system in order to activate the non-GBR bearer which are used to be suspended while performing the 1×SRVCC. Further, the condition to perform the TAU can be narrowed that the TAU is only performed if the UE has not attached to enhanced Higher-Rate Packet Data (eHRPD) during/after the 1×SRVCC.

Figure 6:
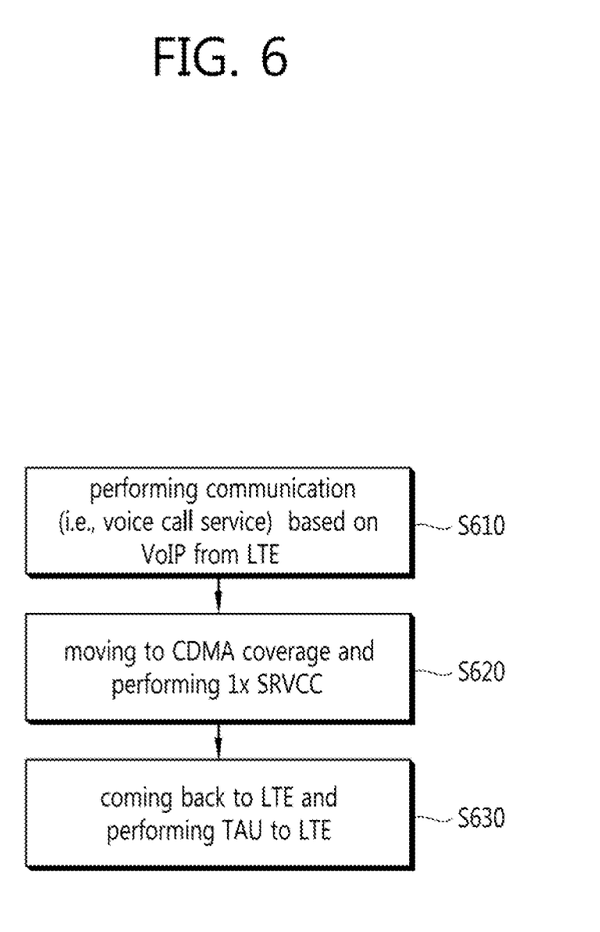
FIG. 6 is a flow chart illustrating the proposed scheme associated with bearer suspension.

FIG. 6 shows a flow chart illustrating the proposed scheme associated with bearer suspension. As shown at Step S610, the UE performs communication based on VoIP session to receive voice call services from the LTE system. In general, a non-GBR bearer bear is established during the VoIP session. However, it should be noted that there is a certain type of non-GBR bearer, such as a bearer for default PDN connection, is not established during the VoIP session. Thereafter, UE may physically move to CDMA coverage as shown at Step S620, or signal quality of the LTE system may be deteriorated and considered to be worse than that of the conventional CDMA network. Namely, the UE may access the conventional CDMA network and performs the 1×SRVCC to continuously receive the voice call service at Step S620. As describe above, the non-GBR bearers are suspended while performing the 1×SRVCC at Step 620. Therefore, the present description proposes to perform TAU procedure to the LTE system, after the UE moves back from the convention CDMA to the LTE coverage, as shown at Step S630. In other words, the present description proposes to perform TAU procedure to the LTE system after performing inter-system change (including handover or cell-reselection) from the conventional CDMA.

Figure 7:
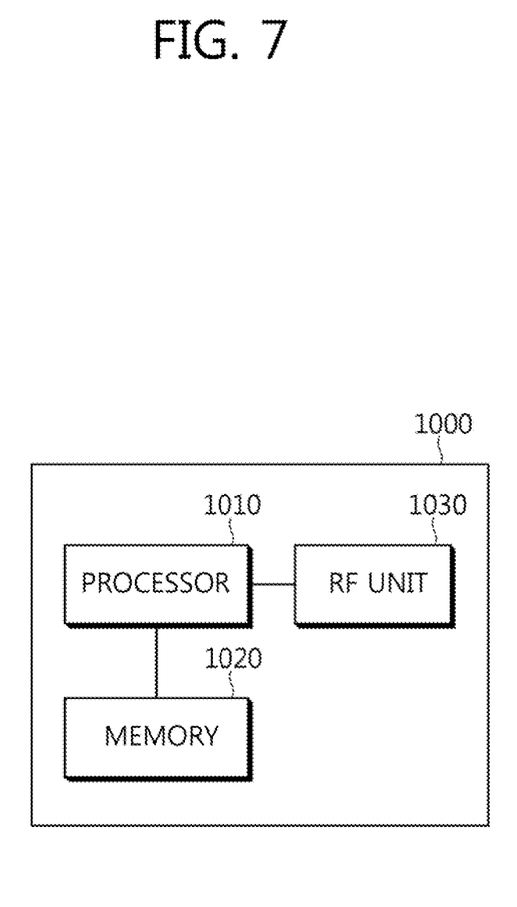
FIG. 7 is a block diagram showing a wireless apparatus to implement technical features of this description.

FIG. 7 is a block diagram showing a wireless apparatus to implement technical features of this description. This may be a part of a UE, or core network (CN) entity. The wireless apparatus 1000 may include a processor 1010, a memory 1020 and a radio frequency (RF) unit 1030.

The processor 1010 may be configured to implement proposed functions, procedures and/or methods described in this description. Layers of the radio interface protocol may be implemented in the processor 1010. The processor 1010 may perform procedure and embodiments described above. The memory 1020 is operatively coupled with the processor 1010, and the RF unit 1030 is operatively coupled with the processor 1010.

The processor 1010 may include application-specific integrated circuit (ASIC), other chipset, logic circuit and/or data processing device. The memory 1020 may include read-only memory (ROM), random access memory (RAM), flash memory, memory card, storage medium and/or other storage device. The RF unit 1030 may include baseband circuitry to process radio frequency signals. When the embodiments are implemented in software, the techniques described herein can be implemented with modules (e.g., procedures, functions, and so on) that perform the functions described herein. The modules can be stored in the memory 1020 and executed by the processor 1010. The memory 1020 can be implemented within the processor 1010 or external to the processor 1010 in which case those can be communicatively coupled to the processor 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of transmitting a signal related to mobility management in a network supporting a number of network modes of operation (NMOs) including NMO 1 and NMO 2, the method performed by a user equipment (UE) and comprising:

receiving a control signal including a packet switched (PS) domain mobility management backoff time value used for access restriction on a PS domain of the network;

starting a PS mobility management backoff timer;

determining whether the UE operates in NMO 1 or NMO 2 while the PS mobility management backoff timer is running:

performing a location area update (LAU) procedure associated with a circuit switched (CS) domain without performing a combined routing area update (RAU) procedure associated with both the PS domain and the CS domain only if the UE operates in NMO 1 and a periodic RAU timer has expired, wherein the UE is configured to perform a combined attach procedure in NMO 1 when attaching to the network, the combined attach procedure associated with both the PS domain and the CS domain, and wherein the UE in the NMO 2 is configured to separately perform a CS attach procedure and a PS attach procedure in NMO 2-separately, when attaching to the network.

2. The method of claim 1, wherein the control signal including the mobility management backoff time value is received from a Serving General packet radio service Support Node or a Mobility Management Entity.

3. The method of claim 1, further comprising:

performing the combined RAU procedure after the PS mobility management backoff timer expires.

4. The method of claim 1, further comprising transmitting a signal related to the LAU procedure to a mobile switching center/visitor location register associated with the CS domain.

5. The method of claim 1, further comprising transmitting a signal related to the combined RAU procedure to a Serving General packet radio service Support Node.

6. The method of claim 1, wherein the UE operates in idle mode.

7. The method of claim 1, wherein the UE is a machine type communication device.

8. The method of claim 1, wherein:

the LAU procedure is used to update a location area associated with the CS domain; and the combined RAU procedure is used to concurrently update a location area associated with the CS domain and a routing area associated with the PS domain.

9. The method of claim 1, wherein:

the UE operates in NMO 1 when a Gs interface is present between a mobile switching center/visitor location register (MSC/VLR) and a Serving General packet radio service Support Node (SGSN) in the network; and the UE operates in NMO 2 when the Gs interface is not present between the MSC/VLR and the SGSN in the network.

\* \* \* \* \*